(12) United States Patent
Tanigawa et al.

(10) Patent No.: US 9,713,229 B2
(45) Date of Patent: Jul. 18, 2017

(54) LIGHTING CONTROL APPARATUS AND LIGHTING SYSTEM

(71) Applicant: Panasonic Intellectual Property Management Co., Ltd., Osaka (JP)

(72) Inventors: Tetsuya Tanigawa, Hyogo (JP); Yuto Hidaka, Osaka (JP); Yuka Hatano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/344,927

(22) Filed: Nov. 7, 2016

(65) Prior Publication Data

US 2017/0135181 A1 May 11, 2017

(30) Foreign Application Priority Data

Nov. 9, 2015 (JP) ................. 2015-219707

(51) Int. Cl.
*H05B 37/00* (2006.01)
*H05B 37/02* (2006.01)
*H05B 33/08* (2006.01)

(52) U.S. Cl.
CPC ..... *H05B 37/0227* (2013.01); *H05B 33/0848* (2013.01); *H05B 33/0866* (2013.01); *H05B 37/0272* (2013.01)

(58) Field of Classification Search
CPC .. H05B 37/029; H05B 37/02; H05B 37/0218; H05B 37/0227; H05B 33/0815; H05B 33/0818; H05B 41/2828; H05B 41/3921; H05B 41/3927; H05B 41/28; Y02B 20/46; Y02B 20/44; F02P 7/0632; F21S 10/02

USPC .......................................................... 315/312
See application file for complete search history.

(56) References Cited

U.S. PATENT DOCUMENTS

2015/0022096 A1* 1/2015 Deixler .............. H05B 37/0218
315/153
2015/0296599 A1* 10/2015 Recker ............... H05B 37/0272
315/153

FOREIGN PATENT DOCUMENTS

| JP | 2000-286063 A | 10/2000 |
| JP | 2001-126881 A | 5/2001 |
| JP | 2001-250695 A | 9/2001 |
| JP | 2002-015877 A | 1/2002 |
| JP | 2005-110090 A | 4/2005 |

(Continued)

*Primary Examiner* — Minh D A
(74) *Attorney, Agent, or Firm* — McDermott Will & Emery LLP

(57) ABSTRACT

A lighting control apparatus which controls dimming levels of lighting devices associated with a plurality of brightness sensors, so as to adjust brightnesses indicated by detection results detected by the plurality of brightness sensors to predetermined brightnesses, the lighting control apparatus including: a querier which periodically queries each of the plurality of brightness sensors for a detection result; and a controller which controls, for each of the lighting devices, the dimming level of the lighting device associated with a brightness sensor among the plurality of brightness sensors queried by the querier, according to the detection result detected by the brightness sensor, wherein the querier assigns priorities to the plurality of brightness sensors, and queries the plurality of brightness sensors for detection results, according to the priorities.

7 Claims, 7 Drawing Sheets

(56) References Cited

FOREIGN PATENT DOCUMENTS

JP      2005-135658 A    5/2005

\* cited by examiner

FIG. 6
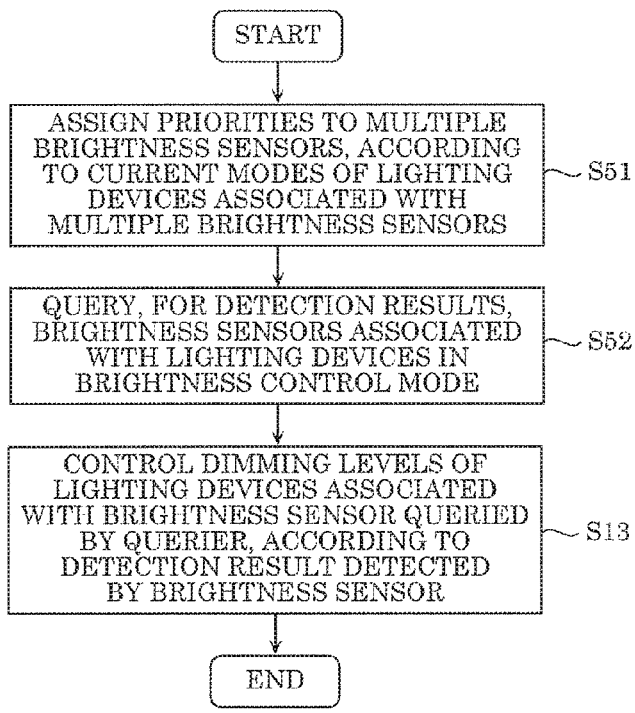
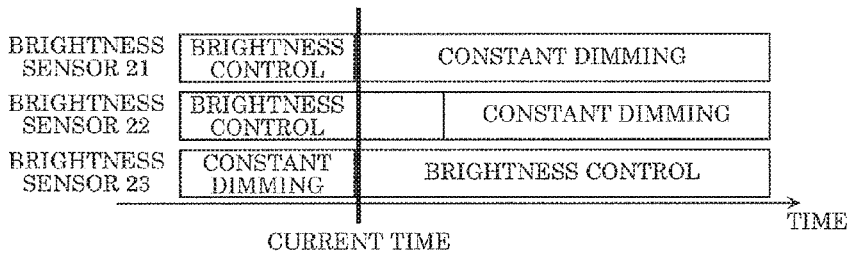

LIGHTING CONTROL APPARATUS AND LIGHTING SYSTEM

CROSS REFERENCE TO RELATED APPLICATION

This application claims the benefit of priority of Japanese Patent Application Number 2015-219707 filed on Nov. 9, 2015, the entire content of which is hereby incorporated by reference.

BACKGROUND

1. Technical Field

The present disclosure relates to a lighting control apparatus and a lighting system.

2. Description of the Related Art

A conventionally known lighting control apparatus controls the brightness (dimming level) of a lighting device so as to adjust, to a target brightness, the brightness of an illuminated area of the lighting device detected by a brightness sensor disposed nearby and associated with the lighting device. Specifically, the lighting control apparatus determines whether current brightness is the target brightness by periodically querying the brightness sensor for the current brightness. The lighting control apparatus adjusts the brightness of the illuminated area to the target brightness by controlling the dimming level of the lighting device by a constant amount each time the lighting control apparatus queries for brightness. Japanese Unexamined Patent Application Publication No. 2001-126881 discloses a technology pertaining to such a lighting control apparatus.

SUMMARY

Meanwhile, it is envisaged that one lighting control apparatus queries each of multiple (e.g., one hundred) brightness sensors for current brightness, and controls the dimming level of a lighting device associated with the brightness sensor. In this case, the lighting control apparatus queries the multiple brightness sensors in turn for brightness and controls in turn the lighting devices associated with the multiple brightness sensors according to the queried brightnesses. Since the lighting control apparatus queries the brightness sensors in turn for brightness, it takes time from when the lighting control apparatus queries one brightness sensor for brightness to when the lighting control apparatus queries the subsequent brightness sensor for brightness. Since the lighting control apparatus controls the dimming level of the lighting device according to the queried brightness, it also takes time to do so, consequently, taking time to adjust the brightness to a target brightness. For example, even if the brightness of some lighting device is desired to be changed shortly while the brightness of some other lighting device is not, it takes time to control the dimming level of the lighting device the brightness of which is desired to be changed shortly.

Thus, an object of the present disclosure is to provide a lighting control apparatus and a lighting system which allow the dimming level of a desired lighting device to be changed shortly.

A lighting control apparatus according to one aspect of the present disclosure controls dimming levels of lighting devices associated with a plurality of brightness sensors, so as to adjust brightnesses indicated by detection results detected by the plurality of brightness sensors to predetermined brightnesses, the lighting control apparatus including: a querier which periodically queries each of the plurality of brightness sensors for a detection result; and a controller which controls, for each of the lighting devices, the dimming level of the lighting device associated with a brightness sensor among the plurality of brightness sensors queried by the querier, according to the detection result detected by the brightness sensor, wherein the querier assigns priorities to the plurality of brightness sensors, and queries the plurality of brightness sensors for detection results, according to the priorities.

A lighting system according to one aspect of the present disclosure includes the above-mentioned lighting control apparatus, the plurality of brightness sensors; and the lighting devices.

According to the lighting control apparatus and the lighting system of one aspect of the present disclosure, the dimming level of a desired lighting device can be changed shortly.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 6 shows (a) a flowchart illustrating Example 4 of the operation of the lighting control apparatus according to the embodiment, (b) a diagram illustrating an example of mode change of a lighting device associated with the brightness sensor according to the embodiment, and (c) a diagram for illustrating the manner of assigning priorities to the brightness sensors in Example 4.

DETAILED DESCRIPTION OF THE EMBODIMENTS

Hereinafter, a lighting control apparatus and a lighting system according to embodiments of the present disclosure are described with reference to the accompanying drawings. The embodiments described below are each merely one specific example of the present disclosure. Thus, values, components, and arrangement and connection between the components, and steps and the order of the steps shown in the following embodiments are merely by way of illustration and not intended to limit the present disclosure. Therefore, among the components in the embodiments below, components not recited in any one of the independent claims defining the most generic part of the inventive concept of the present disclosure are described as arbitrary components.

The figures are schematic illustration and do not necessarily illustrate the present disclosure precisely. In the figures, the same reference sign is used to refer to the same component.

Embodiment

In the following, an embodiment is described with reference to FIGS. 1 through 7.

[Configuration of Lighting System]

Figure 1:
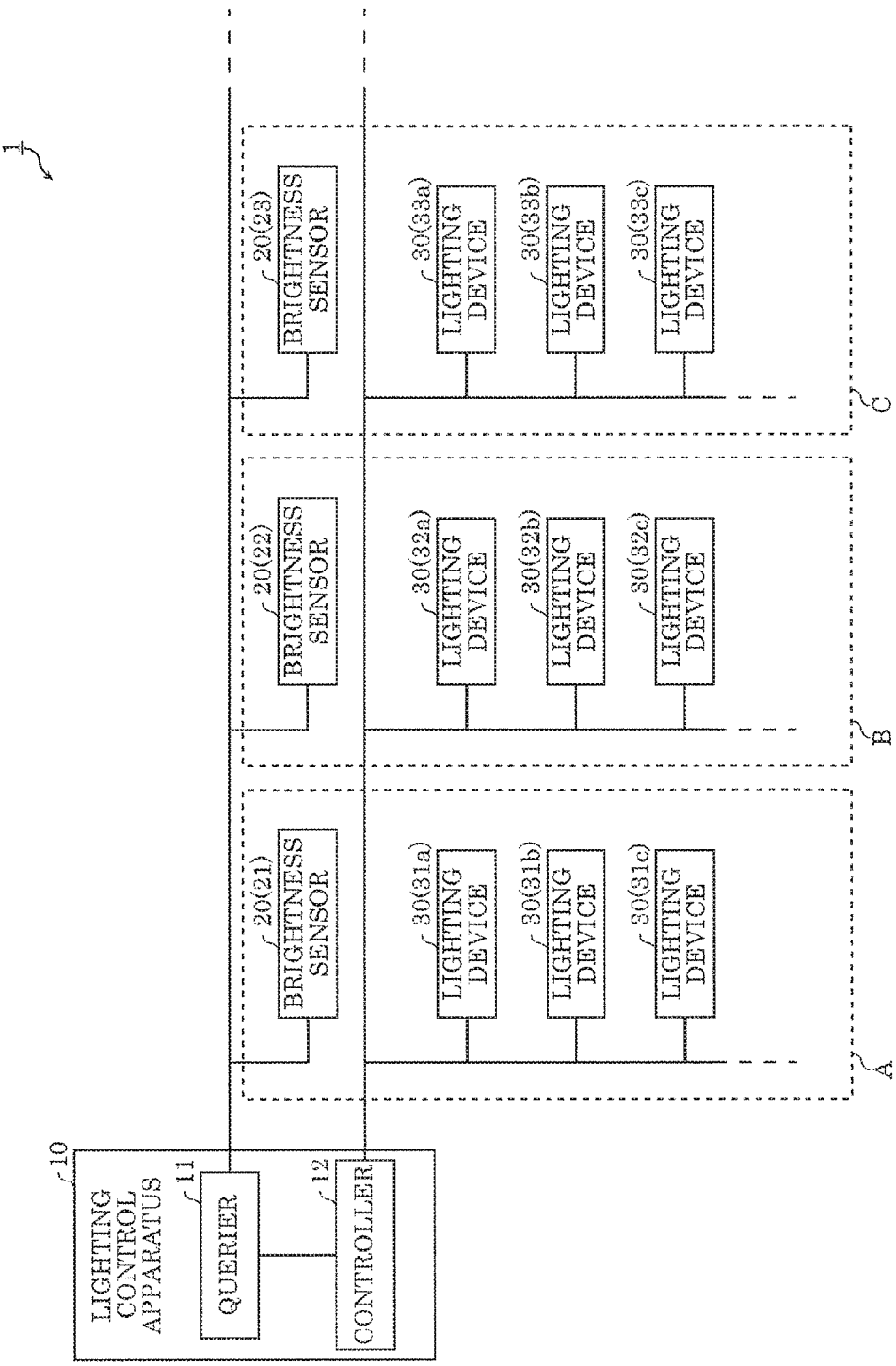
FIG. 1 is a block diagram of an example of a lighting system according to an embodiment.

FIG. 1 is a block diagram of an example of lighting system 1 according to the embodiment.

Lighting system 1 includes lighting control apparatus 10, brightness sensors 20, and lighting devices 30. In lighting system 1, lighting control apparatus 10 controls multiple brightness sensors 20 and multiple lighting devices 30. Lighting control apparatus 10 periodically queries each brightness sensor 20 for brightness indicated by detection result detected by brightness sensor 20. Lighting control apparatus 10 also controls dimming levels of multiple lighting devices 30. Multiple brightness sensors 20, as used herein, are referred to as brightness sensors 21, 22, and 23. Also, multiple lighting devices 30, as used herein, are referred to as lighting devices 31a, 31b, 31c, 32a, 32b, 32c, 33a, 33b, and 33c.

For example, multiple brightness sensors 20 and multiple lighting devices 30 are installed in different rooms. Specifically, for example, brightness sensor 21 is installed in room A, brightness sensor 22 is installed in room B, and brightness sensor 23 is installed in room C. Lighting devices 31a, 31b, and 31c are installed in room A, lighting devices 32a, 32b, and 32c are installed in room B, and lighting devices 33a, 33b, and 33c are installed in room C. Brightness sensor 21 detects brightness of an illuminated area (room A) illuminated by lighting devices 31a, 31b, and 31c. Likewise, brightness sensor 22 detects brightness of an illuminated area (room B) illuminated by lighting devices 32a, 32b, and 32c, and brightness sensor 23 detects brightness of an illuminated area (room C) illuminated by lighting devices 33a, 33b, and 33c. Lighting control apparatus 10 manages brightness sensor 21 and lighting devices 31a, 31b, and 31c in association, in order to control the dimming levels of lighting devices 31a, 31b, and 31c according to the brightness detected by brightness sensor 21. Likewise, lighting control apparatus 10 manages brightness sensor 22 and lighting devices 32a, 32b, and 32c in association, and brightness sensor 23 and lighting devices 33a, 33b, and 33c in association. The dotted boxes in FIG. 1 each indicate such association between brightness sensors 20 and lighting devices 30. It should be noted that multiple brightness sensors 20 and multiple lighting devices 30 may be installed for each of predetermined areas divided in one room, for example.

Multiple brightness sensors 20 may be at least two brightness sensors 20. In other words, multiple brightness sensors 20 may be two brightness sensors 20 or may be four or more brightness sensors 20. Multiple brightness sensors 20 may each be associated with at least one lighting device 30. In other words, multiple brightness sensors 20 may each be associated with one lighting device 30 or with four or more lighting devices 30.

Lighting control apparatus 10 controls the dimming levels of lighting devices 30 associated with multiple brightness sensors 20 so that the brightnesses indicated by detection results detected by multiple brightness sensors 20 are adjusted to predetermined brightnesses. The predetermined brightnesses are target brightnesses. For example, lighting control apparatus 10 controls the dimming levels of lighting devices 30 so that the brightnesses of the illuminated areas are adjusted to the predetermined brightnesses in accordance with a schedule. For example, if the target brightness is increased (decreased) at the transition to the subsequent schedule, lighting control apparatus 10 increases (decreases) the dimming levels of lighting devices 30. It should be noted that the predetermined brightness may be determined for each association of brightness sensor 20 and lighting devices 30. For example, the target brightnesses may be predetermined such that the target brightness is 500 lx (lux) for room A and 600 lx for room B in a certain time slot.

In order to operate as mentioned above, lighting control apparatus 10 includes querier 11 and controller 12.

Querier 11 periodically (for each predetermined time) queries each brightness sensor 20 for detection result. In other words, querier 11 repeatedly queries each brightness sensor 20 for detection result. At this time, querier 11 assigns priorities to multiple brightness sensors 20 and queries them for detection results, according to the priorities. The predetermined time, as used herein, is according to a priority, and may be different for different brightness sensors 20. For example, brightness sensor 21 may be queried at shorter or longer time intervals than brightness sensor 22. The priority is described in detail, with reference to FIGS. 3 through 7 below. Querier 11, for example, includes a transceiver (not shown), and performs wired or wireless communications with multiple brightness sensors 20.

Controller 12 controls the dimming levels of lighting devices 30 associated with brightness sensor 20 queried by querier 11, according to a detection result detected by brightness sensor 20. Since querier 11 queries brightness sensor 20 for a detection result for each predetermined time, controller 12 controls the dimming levels of lighting devices 30 associated with brightness sensor 20 for each predetermined time, according to a detection result detected by brightness sensor 20. For example, if querier 11 queries brightness sensor 21, controller 12 controls the dimming levels of lighting devices 31a, 31b, and 31c associated with brightness sensor 21, according to a detection result detected by brightness sensor 21. Then, after a predetermined time, querier 11 queries brightness sensor 21 again for a detection result and controller 12 controls the dimming levels of lighting devices 31a, 31b, and 31c associated with brightness sensor 21 according to the detection result detected by brightness sensor 21. Controller 12, for example, includes a transceiver (not shown) and performs wired or wireless communications with lighting devices 30.

Moreover, if the brightness indicated by a detection result queried for by querier 11 and detected by certain brightness sensor 20 (e.g., brightness sensor 21) is not the predetermined brightness, controller 12 gives dimming instructions to lighting devices 31a, 31b, and 31c associated with brightness sensor 21. Stated differently, if the brightness indicated by the detection result queried for by querier 11 and detected by brightness sensor 21 is the predetermined brightness, controller 12 gives no dimming instruction to lighting devices 31a, 31b, and 31c associated with brightness sensor 21. In other words, controller 12 gives lighting devices 31a, 31b, and 31c dimming instructions for changing the dimming levels of lighting devices 31a, 31b, and 31c by predetermined amounts each time querier 11 queries brightness sensor 21 for detection result, until the brightness indicated by a detected result detected by brightness sensor 21 is adjusted to the predetermined brightness. Once the brightness indicated by a detection result detected by brightness sensor 21 is adjusted to the predetermined brightness, controller 12 gives no dimming instruction to lighting devices 31a, 31b, and 31c even though querier 11 queries brightness sensor 21 for a detection result. This allows the brightness of the illuminated area of lighting devices 31a, 31b, and 31c to be adjusted to the predetermined brightness.

Controller 12 further controls color temperatures of lighting devices 30. Controller 12 controls the color temperatures of lighting devices 30 to predetermined color temperatures, for example, in accordance with a schedule. The predetermined color temperatures are target color temperatures. If the target color temperatures are increased (decreased) at the transition to the subsequent schedule, controller 12 increases (decreases) the color temperatures of lighting devices 30.

Querier 11 and controller 12 are implemented in, for example, processors or the like which execute control programs stored in a storage (not shown) included in lighting control apparatus 10. However, querier 11 and controller 12 may be implemented in microcomputers or dedicated circuits, for example.

Brightness sensor 20 detects the brightness of the illuminated area of lighting devices 30 associated with brightness sensor 20. If the illuminated area receives natural light, brightness sensor 20, for example, detects a total brightness of light beams output from lighting devices 30 and natural light. Brightness sensor 20 is, for example, configured of a phototransistor or photodiode.

Lighting device 30 is capable of diming the output light and controlling the color of the output light. Lighting device 30 changes its dimming level to dim, by controller 12 adjusting light output from a light source included in lighting device 30. Lighting device 30 includes multiple light sources configured of, for example, a blue LED and yellow phosphor which emit light beams having different color temperatures, and changes the color temperatures of the light beams to control the color of the light output from lighting device 30, by controller 12 adjusting the light output ratio between the light sources. It should be noted that lighting device 30 may include light sources configured of, for example, a red LED, a green LED, and a blue LED, and change the color temperatures of the light beams to control the color of light output from lighting device 30, by the light output ratio between the red LED, the green LED, and the blue LED being adjusted. Alternatively, lighting device 30 may include light sources configured of, for example, a near ultraviolet LED and RGB phosphors, and change the color temperatures of the light beams to control the color of light output from lighting device 30, by a light output ratio between the light sources being adjusted. In other words, lighting device 30 may be any lighting device capable of changing the color temperature.

Moreover, lighting device 30 has a brightness control mode in which the brightness is controlled according to a detection result detected by brightness sensor 20, and a constant dimming mode in which the dimming level of lighting device 30 is maintained constant. For example, lighting device 30 is switched by controller 12 between the brightness control mode and the constant dimming mode, in accordance with a schedule.

[Operation of Lighting Control Apparatus]

Next, operation of lighting control apparatus 10 is described.

Figure 2:
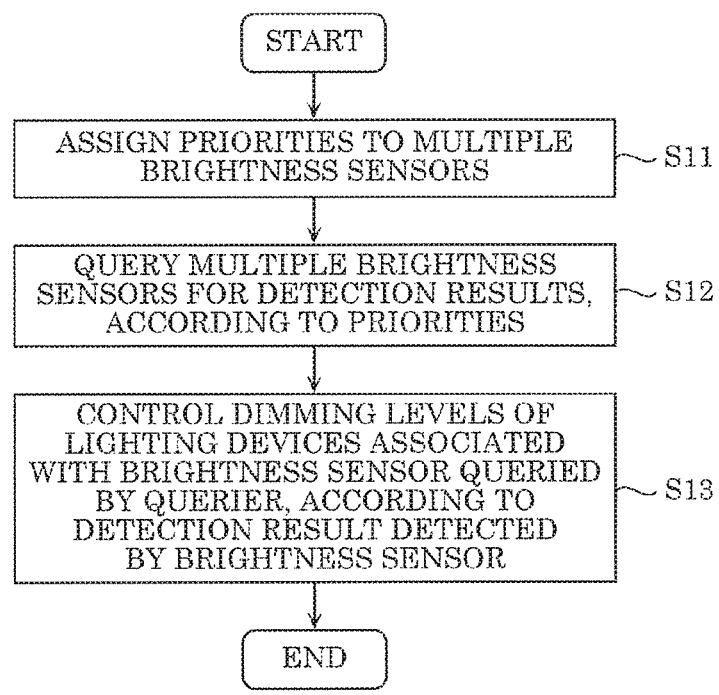
FIG. 2 is a flowchart illustrating an example of operation of a lighting control apparatus according to the embodiment.

FIG. 2 is a flowchart illustrating an example of operation of lighting control apparatus 10 according to the embodiment.

Initially, querier 11 assigns priorities to multiple brightness sensors 20 (step S11).

Next, querier 11 queries multiple brightness sensors 20 for detection results, according to the priorities (step S12). The operations in steps S11 and S12 are described in detail, with reference to Examples 1 through 5 illustrated in FIGS. 3 through 7 below.

Then, controller 12 controls the dimming levels of lighting devices 30 associated with brightness sensor 20 queried by querier 11, according to the detection result detected by brightness sensor 20 (step S13). Specifically, as mentioned above, if the brightness indicated by the detection result queried for by querier 11 and detected by brightness sensor 20 is not the predetermined brightness, controller 12 gives dimming instructions to lighting devices 30 associated with brightness sensor 20. If the brightness indicated by the detection result is the predetermined brightness, controller 12 gives no dimming instruction to lighting devices 30.

Here, Examples 1 through 5 of the operation of lighting control apparatus 10 are described with reference to FIGS. 3 through 7.

Example 1 of Operation of Lighting Control Apparatus

First, Example 1 of the operation of lighting control apparatus 10 is described with reference to FIG. 3.

Figure 3:
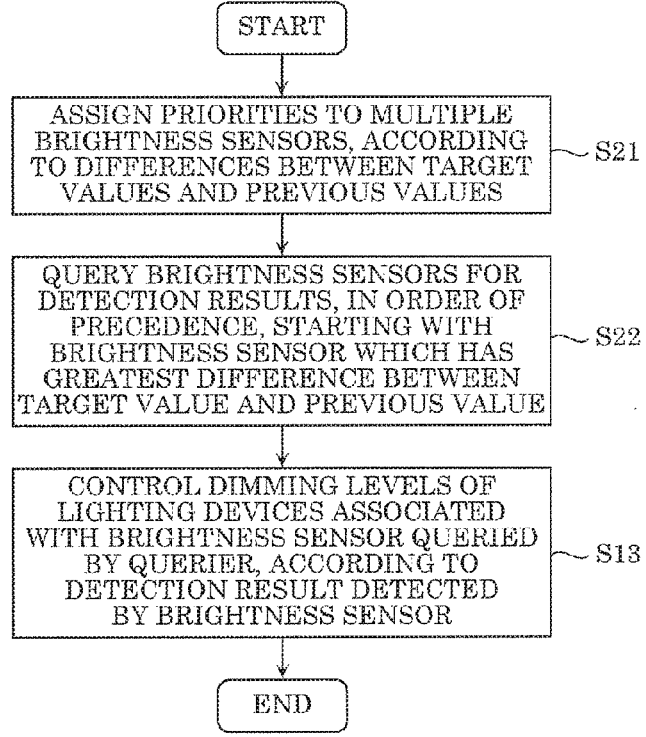
FIG. 3 shows (a) a flowchart illustrating Example 1 of the operation of the lighting control apparatus according to the embodiment, and (b) a diagram for illustrating the manner of assigning priorities to brightness sensors in Example 1.

Part (a) of FIG. 3 is a flowchart illustrating Example 1 of the operation of lighting control apparatus 10 according to the embodiment. As illustrated in (a) of FIG. 3, in Example 1 of the operation of lighting control apparatus 10, steps S21 and S22 show the details of steps S11 and S12, respectively, illustrated in FIG. 2. Although (a) of FIG. 3 also illustrates step S13 as with FIG. 2, the operation in step S13 is the same as that in FIG. 2 and thus the description is omitted. Although step S13 is illustrated in the subsequent figures as well, the description of step S13 in the subsequent figures is omitted.

Part (b) of FIG. 3 is a diagram for illustrating the manner of assigning priorities to the brightness sensors in Example 1.

Initially, querier 11 assigns priorities to multiple brightness sensors 20, according to differences between target values and previous values of multiple brightness sensors 20, the target values indicating predetermined brightnesses, the previous values being brightness values indicated by detection result previously queried for by querier 11 and detected by multiple brightness sensors 20 (step S21).

As shown in (b) of FIG. 3, suppose the target values of brightness sensors 21, 22, and 23 are 500 lx, for example. The target values are stored in, for example, a storage (not shown) included in lighting control apparatus 10. It should be noted that brightness sensors 21, 22, and 23 may have different target values. Moreover, the target values each may have a predetermined range. For example, the target value may not be limited to one value, such as 500 lx, and may have a range such as from 490 lx to 510 lx. In (b) of FIG. 5 below, an example is shown in which the target value has a predetermined range.

As shown in (b) of FIG. 3, suppose the previous value of brightness sensor 21 is 490 lx, the previous value of brightness sensor 22 is 540 lx, and the previous value of brightness sensor 23 is 450 lx, for example. Querier 11 queries multiple brightness sensors 20 for detection results for each predetermined time, and stores, as the previous values of multiple brightness sensors 20, the brightness values indicated by the queried detection results into, for example, the storage (not shown) included in lighting control apparatus 10.

Then, querier 11 assigns priorities to multiple brightness sensors 20, according to differences between the target values and previous values. As shown in (b) of FIG. 3, the difference between the target value and previous value of brightness sensor 21 is 10 lx, the difference between the target value and previous value of brightness sensor 22 is 40 lx, and the difference between the target value and previous value of brightness sensor 23 is 50 lx. Querier 11 assigns priorities to multiple brightness sensors 20 so as to assign a higher priority level to brightness sensor 20 that has a greater difference between the target value and the previous value. The difference between the target value and the previous value refers to, for example, an absolute value of the difference between the target value and the previous value. The priority shown in (b) of FIG. 3 means that a smaller value indicates a higher priority level. In other words, querier 11 assigns the priority level 1 to brightness sensor 23 which has the a greatest difference between the target value and the previous value, the priority level 2 to brightness sensor 22, and priority level 3 to brightness sensor 21.

Next, querier 11 preferentially queries, for detection results, brightness sensors 20 that have great differences between the target values and the previous values (step S22). Specifically, querier 11 queries brightness sensors 20 for detection results, in order of precedence, starting with brightness sensor 23 assigned with the priority level 1 and having the greatest difference between the target value and the previous value among differences between the target values and previous values. Accordingly, querier 11 queries brightness sensor 23 at short time intervals. Then, controller 12 controls the dimming levels of lighting devices 33a, 33b, and 33c, according to the detection result queried for by querier 11 and detected by brightness sensor 23. For example, if the detection result queried for and detected by brightness sensor 23 this time is a brightness value (e.g., 470 lx) yet less than the target value, controller 12 gives dimming instructions to lighting devices 33a, 33b, and 33c to increase the dimming levels of lighting devices 33a, 33b, and 33c. Next, querier 11 queries, for a detection result, brightness sensor 22 assigned with the priority level 2, and controller 12 controls the dimming levels of lighting devices 32a, 32b, and 32c, according to the detection result detected by brightness sensor 22. In this manner, querier 11 queries brightness sensors 20 in turn, in order of precedence, starting with brightness sensor 20 assigned with a highest priority level and having a greatest difference between the target value and the previous value, and controller 12 controls the dimming levels of lighting devices 30 in turn, in order of precedence, starting with lighting devices 30 that are associated with brightness sensor 20 assigned with the highest priority level.

While the difference between the target value and the previous value refers to an absolute value of the difference between the target value and the previous value, it should be noted that the present disclosure is not limited thereto. For example, the difference between the target value and the previous value may refer to an absolute value of a percentage of the difference between the target value and the previous value to the target value. In this case, the difference between the target value and the previous value of brightness sensor 21 is 2%, the difference between the target value and the previous value of brightness sensor 22 is 8%, and the difference between the target value and the previous value of brightness sensor 23 is 10%.

Example 2 of Operation of Lighting Control Apparatus

Next, Example 2 of the operation of lighting control apparatus 10 is described with reference to FIG. 4.

Figure 4:
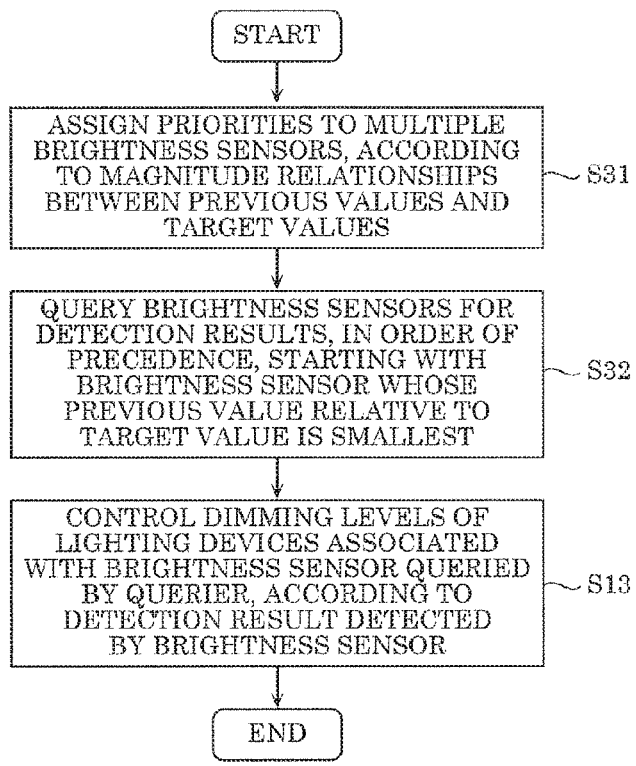
FIG. 4 shows (a) a flowchart illustrating Example 2 of the operation of the lighting control apparatus according to the embodiment, and (b) a diagram for illustrating the manner of assigning priorities to the brightness sensors in Example 2.

Part (a) of FIG. 4 is a flowchart illustrating Example 2 of the operation of lighting control apparatus 10 according to the embodiment. As illustrated in (a) of FIG. 4, in Example 2 of the operation of lighting control apparatus 10, steps S31 and S32 show the details of steps S11 and S12, respectively, illustrated in FIG. 2.

Part (b) of FIG. 4 is a diagram for illustrating the manner of assigning priorities to the brightness sensors in Example 2.

Initially, querier 11 assigns priorities to multiple brightness sensors 20, according to magnitude relationships between previous values and target values of multiple brightness sensors 20, the previous values being brightness values indicated by detection results previously queried for by querier 11 and detected by brightness sensors 20, the target values indicating predetermined brightnesses (step S31).

As shown in (b) of FIG. 4, suppose the target values of brightness sensors 21, 22, and 23 are 500 lx, for example. The target values are stored in, for example, the storage (not shown) included in lighting control apparatus 10.

As shown in (b) of FIG. 4, suppose the previous value of brightness sensor 21 is 490 lx, the previous value of brightness sensor 22 is 540 lx, and the previous value of brightness sensor 23 is 450 lx, for example. Querier 11 queries multiple brightness sensors 20 for detection results for each predetermined time, and stores, as the previous values of multiple brightness sensors 20, the brightness values indicated by the queried detection results into, for example, the storage (not shown) included in lighting control apparatus 10.

Then, querier 11 assigns priorities to multiple brightness sensors 20, according to magnitude relationships between the previous values and the target values of multiple brightness sensors 20. As shown in (b) of FIG. 4, the difference of the previous value of brightness sensor 21 to the target value is −10 lx, the difference of the previous value of brightness sensor 22 to the target value is +40 lx, and the difference of the previous value of brightness sensor 23 to the target value is −50 lx. Querier 11 assigns priorities to multiple brightness sensors 20, according to magnitude relationships between the previous values and the target values of multiple brightness sensors 20 so as to assign a higher priority level to brightness sensor 20 whose previous value relative to the target value is smaller. The priority shown in (b) of FIG. 4 means that a smaller value indicates a higher priority level. In other words, querier 11 assigns high priority levels to brightness sensors 21 and 23 whose previous values relative to the target values are small. Further, among the brightness sensors whose previous values relative to the target values are small, querier 11 assigns a higher priority level to brightness sensor 20 which has a greater difference between the target value and the previous value (absolute value). This results in querier 11 assigning brightness sensor 23 with the priority level 1, brightness sensor 21 with the priority level 2, and brightness sensor 22 with the priority level 3.

Next, querier 11 preferentially queries, for detection results, brightness sensors 20 whose previous values relative to the target values are small (step S32). Specifically, querier 11 queries brightness sensors 20 for detection results, in order of precedence, starting with brightness sensor 23 assigned with the priority level 1 and having a previous value less than the target value and a greatest difference between the target value and the previous value. Accordingly, querier 11 queries brightness sensor 23 at short time intervals. Then, controller 12 controls the dimming levels of lighting devices 33a, 33b, and 33c, according to the detection result queried for by querier 11 and detected by brightness sensor 23. For example, if the detection result queried for and detected by brightness sensor 23 this time is the target value (500 lx), controller 12 does not give dimming instructions to lighting devices 33a, 33b, and 33c to change the dimming levels of lighting devices 33a, 33b, and 33c. Next, querier 11 queries, for a detection result, brightness sensor 21 assigned with the priority level 2, and controller 12 controls the dimming levels of lighting devices 31a, 31b, and 31c, according to the detection result detected by brightness sensor 21. In this manner, querier 11 queries brightness sensors 20 in turn, in order of precedence, starting with brightness sensor 20 assigned with a highest priority level and the previous value of which is smaller than the target values, and controller 12 controls the dimming levels of lighting devices 30 in turn, in order of precedence, starting with lighting devices 30 that are associated with brightness sensor 20 assigned with the highest priority level.

While Examples 1 and 2 use the previous values to assign priorities to multiple brightness sensors 20, it should be noted that if no previous value is stored upon initial power-up, for example, querier 11 queries multiple brightness sensors 20 in turn, without assigning priorities to them. Then, previous values of detection results detected by multiple brightness sensors 20 in response to querier 11 querying all multiple brightness sensors 20 are stored into the storage, thereby allowing querier 11 to assign priorities to multiple brightness sensors 20, using the previous values.

While querier 11 queries brightness sensors 20 in turn, according to the priorities, the present disclosure is not limited thereto. For example, querier 11 may increase the periodicity of query to brightness sensors 20 assigned with high priority levels. The case of an increased periodicity of query to brightness sensors 20 assigned with high priority levels is now described, with reference to Example 1.

Suppose querier 11, initially, queries brightness sensor 23 whose difference between the target value and the previous value is 50 lx, and a detection result detected by brightness sensor 23 is 470 lx, for example. At this time, the previous value of brightness sensor 23 is updated to 470 lx, which yields 30 lx of difference between the target value and the previous value. Suppose querier 11 subsequently queries brightness sensor 22 whose difference between the target value and the previous value is 40 lx, which is now the greatest difference among multiple brightness sensors 20, and a detection result detected by brightness sensor 22 is 520 lx, for example. At this time, the previous value of brightness sensor 22 is updated to 520 lx, which yields 20 lx of difference between the target value and the previous value. Then, querier 11 queries brightness sensor 23 whose difference between the target value and the previous value is 30 lx, which is now the greatest difference among multiple brightness sensors 20.

In this manner, the periodicity of query to brightness sensors 20 assigned with high priority levels may be increased. However, if the periodicity of query to brightness sensors 20 assigned with high priority levels is increased, brightness sensors 20 assigned with low priority levels may not be queried indefinitely. For this reason, querier 11 may query all multiple brightness sensors 20 for every predetermined time (e.g., 5 minutes).

Example 3 of Operation of Lighting Control Apparatus

Next, Example 3 of the operation of lighting control apparatus 10 is described with reference to FIG. 5.

Figure 5:
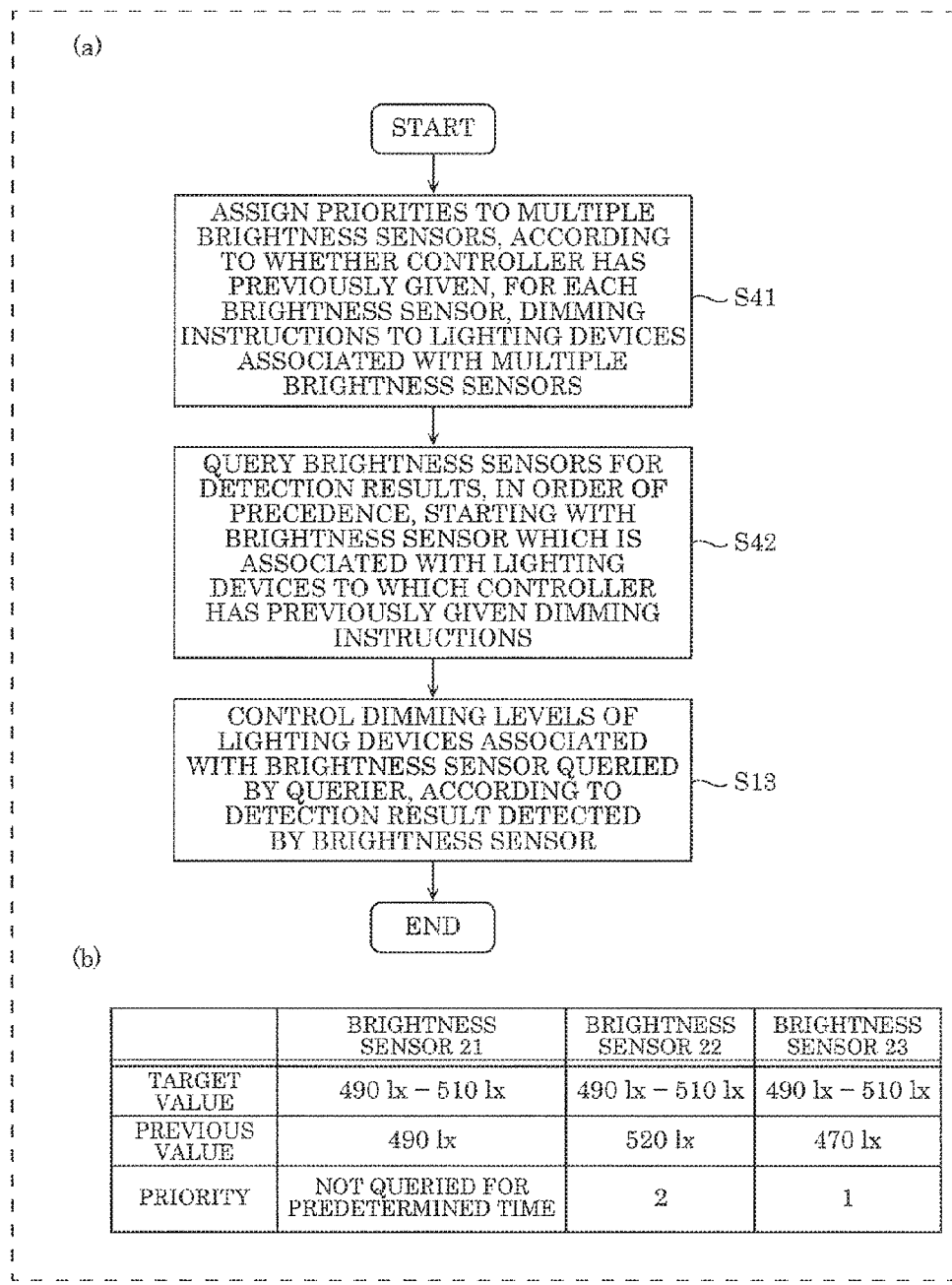
FIG. 5 shows (a) a flowchart illustrating Example 3 of the operation of the lighting control apparatus according to the embodiment, and (b) a diagram for illustrating the manner of assigning priorities to the brightness sensors in Example 3.

Part (a) of FIG. 5 is a flowchart illustrating Example 3 of the operation of lighting control apparatus 10 according to the embodiment. As illustrated in (a) of FIG. 5, in Example 3 of the operation of lighting control apparatus 10, steps S41 and S42 show the details of steps S11 and S12, respectively, illustrated in FIG. 2.

Part (b) of FIG. 5 is a diagram for illustrating the manner of assigning priorities to the brightness sensors in Example 3.

Initially, querier 11 assigns priorities to multiple brightness sensors 20, according to whether controller 12 has previously given dimming instructions to lighting devices 30 associated with multiple brightness sensors 20 (step S41).

As shown in (b) of FIG. 5, suppose the target values of brightness sensors 21, 22, and 23 are each in a range from 490 lx to 510 lx, for example. As mentioned above, the target value may have a predetermined range, in which the target values each have a range from 500 lx to plus or minus 10 lx. The target values are stored in, for example, the storage (not shown) included in lighting control apparatus 10.

As shown in (b) of FIG. 5, suppose the previous value of brightness sensor 21 is 490 lx, the previous value of brightness sensor 22 is 520 lx, and the previous value of brightness sensor 23 is 470 lx, for example. Querier 11 queries multiple brightness sensors 20 for detection results for each predetermined time, and stores, as the previous values of multiple brightness sensors 20, the brightness values indicated by the queried detection results into, for example, the storage (not shown) included in lighting control apparatus 10.

Then, querier 11 assigns priorities to multiple brightness sensors 20, according to whether controller 12 has previously given dimming instructions to lighting devices 30 associated with multiple brightness sensors 20. At the previous query by querier 11, the detection result detected by brightness sensor 21 is 490 lx, which is the target value, and thus controller 12 gives no dimming instruction to lighting devices 31a, 31b, and 31c then. On the other hand, at the previous query by querier 11, the detection result detected by brightness sensor 22 is 520 lx, which is not the target value, and thus controller 12 gives dimming instructions to lighting devices 32a, 32b, and 32c then. Likewise, at the previous query by querier 11, the detection result detected by brightness sensor 23 is 470 lx, which is not the target value, and thus controller 12 gives dimming instructions to lighting devices 33a, 33b, and 33c then.

Querier 11 assigns priorities to brightness sensors 20 according to whether controller 12 has previously given, for each of brightness sensors 20, dimming instructions to lighting devices 30 associated with brightness sensor 20, so as to assign high priority levels to brightness sensors 20 that are associated with lighting devices 30 to which controller 12 has previously given the dimming instructions. The priority shown in (b) of FIG. 5 means that a smaller value indicates a higher priority level. In other words, querier 11 assigns high priority levels to brightness sensor 22 associated with lighting devices 32a, 32b, and 32c to which controller 12 has previously given dimming instructions, and brightness sensor 23 associated with lighting devices 33a, 33b, and 33c to which controller 12 has previously given dimming instructions. Further, among the brightness sensors associated with lighting devices 30 to which controller 12 has previously given the dimming instructions, querier 11 assigns a higher priority level to brightness sensor 20 which has a greater difference between the target value and the previous value (absolute value). This results in querier 11 assigning brightness sensor 23 with the priority level 1, and brightness sensor 22 with the priority level 2. Since the detection result detected by brightness sensor 21 is already the target value and lighting devices 31a, 31b, and 31c associated with brightness sensor 21 are given no dimming instruction, querier 11 does not assign a priority nor query brightness sensor 21 for a predetermined time. However, querier 11 queries brightness sensor 21 for a detection result for every predetermined time (e.g., 5 minutes) to prevent brightness sensor 21 from being not queried indefinitely.

Next, querier 11 preferentially queries, for detection results, brightness sensors 20 that are associated with lighting devices 30 to which controller 12 has previously given dimming instructions (step S42). Specifically, querier 11 queries brightness sensors 20 for detection results, in order of precedence, starting with brightness sensor 23 that is assigned with the priority level 1 and associated with lighting devices 30 to which controller 12 has previously given dimming instructions and having a greatest difference between the target value and the previous value. Accordingly, querier 11 queries brightness sensor 23 at short time intervals. Then, controller 12 controls the dimming levels of lighting devices 33a, 33b, and 33c, according to the detection result queried for by querier 11 and detected by brightness sensor 23. For example, if the detection result queried for and detected by brightness sensor 23 this time is a brightness value (e.g., 480 lx) yet smaller than the target value, controller 12 gives dimming instructions to lighting devices 33a, 33b, and 33c to increase the dimming levels of lighting devices 33a, 33b, and 33c. Accordingly, this results in querier 11 querying brightness sensor 23 at the subsequent query as well. Next, querier 11 queries brightness sensor 22 assigned with the priority level 2 for a detection result, and controller 12 controls the dimming levels of lighting devices 32a, 32b, and 32c, according to the detection result detected by brightness sensor 22. For example, if the detection result queried for and detected by brightness sensor 22 is the target value (510 lx), controller 12 does not give dimming instructions to lighting devices 32a, 32b, and 32c to change the dimming levels of lighting devices 32a, 32b, and 32c. Accordingly, this results in querier 11 not querying brightness sensor 22 at the subsequent query. In this manner, querier 11 queries brightness sensors 20 in turn, in order of precedence, starting with brightness sensors 20 associated with lighting devices 30 to which controller 12 has previously given dimming instructions, and controller 12 controls the dimming levels of lighting devices 30 in turn, in order of precedence, starting with lighting devices 30 that are associated with brightness sensor 20 assigned with the highest priority level.

It should be noted that lighting device 30 may have capabilities of fading the dimming level thereof, in which case, if controller 12 gives a dimming instruction to lighting device 30, lighting device 30 changes its dimming level over a predetermined fade time. Accordingly, querier 11 may not query brightness sensor 20 associated with lighting devices 30 to which controller 12 has previously given the dimming instructions if they are in the fade time. Instead, querier 11 may query, for example, brightness sensor 20 that has the next highest priority level.

Example 4 of Operation of Lighting Control Apparatus

Next, Example 4 of the operation of lighting control apparatus 10 is described with reference to FIG. 6.

Part (a) of FIG. 6 is a flowchart illustrating Example 4 of the operation of lighting control apparatus 10 according to the embodiment. As illustrated in (a) of FIG. 6, in Example 4 of the operation of lighting control apparatus 10, steps S51 and S52 show the details of steps S11 and S12, respectively, illustrated in FIG. 2.

Part (b) of FIG. 6 is a diagram illustrating an example of mode change of lighting devices 30 associated with brightness sensors 20 according to the embodiment. For example, lighting devices 30 associated with brightness sensor 20 are switched between the brightness control mode and the constant dimming mode, in accordance with a schedule shown in (b) of FIG. 6. Suppose the current time is as indicated in bold in (b) of FIG. 6. At this time, lighting devices 31a, 31b, and 31c associated with brightness sensor 21 are in the constant dimming mode; lighting devices 32a, 32b, and 32c associated with brightness sensor 22 are in the brightness control mode; and lighting devices 33a, 33b, and 33c associated with brightness sensor 23 are immediately after switched from the constant dimming mode to the brightness control mode.

Part (c) of FIG. 6 is a diagram for illustrating the manner of assigning priorities to the brightness sensors in Example 4.

Initially, querier 11 assigns priorities to multiple brightness sensors 20, according to current modes of lighting devices 30 associated with multiple brightness sensors 20 (step S51). As shown in (b) and (c) of FIG. 6, for example, brightness sensor 21 is in the constant dimming mode, and brightness sensor 22 and brightness sensor 23 are in the brightness control mode. Querier 11 assigns priorities to brightness sensors 20, according to the current modes of lighting devices 30, so as to assign high priority levels to brightness sensors 20 that are associated with lighting devices 30 in the brightness control mode. The priority shown in (b) of FIG. 6 means that a smaller value indicates a higher priority level. In other words, querier 11 assigns high priority levels to brightness sensor 22 and brightness sensor 23 respectively associated with lighting devices 32a, 32b, and 32c and lighting devices 33a, 33b, and 33c that are in the brightness control mode. Further, among brightness sensors 20 associated with lighting devices 30 that are in the brightness control mode, querier 11 assigns a higher priority level to brightness sensor 20 associated with lighting devices 30 that are sooner after changed from the constant dimming mode to the brightness control mode. This results in querier 11 assigning brightness sensor 23 with the priority level 1, and brightness sensor 22 with the priority level 2. Since lighting devices 31a, 31b, and 31c associated with brightness sensor 21 are in the constant dimming mode, querier 11 does not assign a priority nor query brightness sensor 21 for a predetermined time. However, querier 11 queries brightness sensor 21 for a detection result for every predetermined time (e.g., 5 minutes) even though lighting devices 31a, 31b, and 31c are in the constant dimming mode. This detects a brightness of the illuminated area of lighting devices 31a, 31b, and 31c, thereby allowing the brightness of the illuminated area of lighting devices 31a, 31b, and 31c to be notified to a user via a terminal device (not shown) or the like, for example.

Next, querier 11 preferentially queries, for detection results, brightness sensors 20 that are associated with lighting devices 30 in the brightness control mode (step S52). Specifically, querier 11 queries, for detection results, brightness sensors 20 associated with lighting devices 30 in the brightness control mode, in order of precedence, starting with brightness sensors 20 associated with lighting devices 30 immediately after switched from the constant dimming mode to the brightness control mode. Accordingly, querier 11 queries brightness sensor 23 at short time intervals. Then, controller 12 controls the dimming levels of lighting devices 33a, 33b, and 33c, according to the detection result queried for by querier 11 and detected by brightness sensor 23. Next, querier 11 queries, for a detection result, brightness sensor 22 assigned with the priority level 2, and controller 12 controls the dimming levels of lighting devices 32a, 32b, and 32c, according to the detection result detected by brightness sensor 22. In this manner, querier 11 queries brightness sensors 20 in turn, in order of precedence, starting with brightness sensors 20 that are associated with lighting devices 30 in the brightness control mode. Specifically, querier 11 queries, for detection results, brightness sensors 20 associated with lighting devices 30 in the brightness control mode, in order of precedence, starting with brightness sensor 20 that is associated with lighting devices 30 immediately after switched from the constant dimming mode to the brightness control mode. Then, controller 12 controls the dimming levels of lighting devices 30 in turn, in order of precedence, starting with lighting devices 30 that are associated with brightness sensor 20 assigned with the highest priority level.

Example 5 of Operation of Lighting Control Apparatus

Next, Example 5 of the operation of lighting control apparatus 10 is described with reference to FIG. 7.

Figure 7:
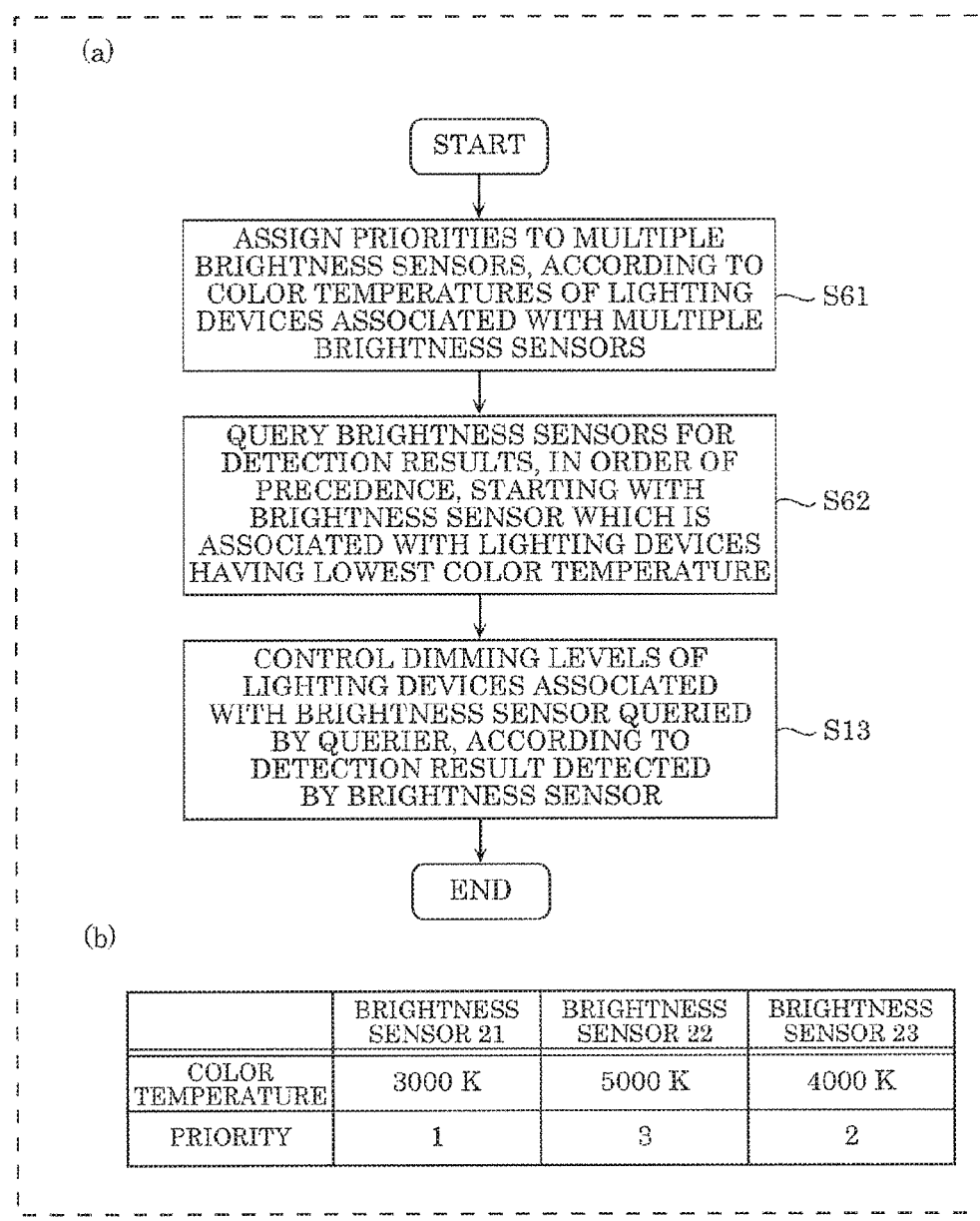
FIG. 7 shows (a) a flowchart illustrating Example 5 of the operation of the lighting control apparatus according to the embodiment, and (b) a diagram for illustrating the manner of assigning priorities to the brightness sensors in Example 5.

Part (a) of FIG. 7 is a flowchart illustrating Example 5 of the operation of lighting control apparatus 10 according to the embodiment. As illustrated in (a) of FIG. 7, in Example 5 of the operation of lighting control apparatus 10, steps S61 and S62 show the details of steps S11 and S12, respectively, illustrated in FIG. 2.

Part (b) of FIG. 7 is a diagram for illustrating the manner of assigning priorities to the brightness sensors in Example 5.

Initially, querier 11 assigns priorities to multiple brightness sensors 20, according to color temperatures of lighting devices 30 associated with multiple brightness sensors 20 (step S61).

As shown in (b) of FIG. 7, suppose color temperatures of lighting devices 30 associated with brightness sensor 21 are 3000K, color temperatures of lighting devices 30 associated with brightness sensor 22 are 5000K, and color temperatures of lighting devices 30 associated with brightness sensor 23 are 4000K, for example. Querier 11 assigns priorities to multiple brightness sensors 20, according to the color temperatures of lighting devices 30 associated with brightness sensors 20 so as to assign a higher priority level to brightness sensor 20 that is associated with lighting devices 30 producing a lower color temperature. The priority shown in (b) of FIG. 7 means that a smaller value indicates a higher priority level. In other words, querier 11 assigns the priority level 1 to brightness sensor 21 that is associated with lighting devices 31a, 31b, and 31c producing a lowest color temperature, the priority level 2 to brightness sensor 23, and the priority level 3 to brightness sensor 22. It should be noted that, although not shown, the previous values detected by brightness sensors 20 are lower than the target values.

Next, querier 11 preferentially queries, for detection results, brightness sensors 20 that are associated with lighting devices 30 producing low color temperatures (step S62). Specifically, querier 11 queries brightness sensors 20 for detection results, in order of precedence, starting with brightness sensor 21 assigned with the priority level 1 and associated with lighting devices 31a, 31b, and 31c that are producing a lowest color temperature. Accordingly, querier 11 queries brightness sensor 21 at short time intervals. Then, controller 12 controls the dimming levels of lighting devices 33a, 33b, and 33c, according to the detection result queried for by querier 11 and detected by brightness sensor 23. Next, querier 11 queries brightness sensor 23 assigned with the priority level 2 for a detection result, and controller 12 controls the dimming levels of lighting devices 33a. 33b, and 33c, according to the detection result detected by brightness sensor 23. In this manner, querier 11 queries brightness sensors 20 in turn, in order of precedence, starting with brightness sensor 20 associated with lighting devices 30 producing the lowest color temperature among lighting devices 30 associated with brightness sensors 20, and controller 12 controls the dimming levels of lighting devices 30 associated with brightness sensor 20 assigned with the highest priority level.

As described above, querier 11 queries multiple brightness sensors 20 for detection results, according to the priorities indicated in Examples 1 through 5, and queries brightness sensors 20 for detection results, in order of precedence, starting with brightness sensor 20 assigned with a highest priority level.

[Effects]

It is envisaged that one lighting control apparatus queries each of multiple (e.g., one hundred) brightness sensors for current brightness, and controls a lighting device associated with the brightness sensor. In this case, the lighting control apparatus queries the multiple brightness sensors in turn for brightness. Thus, it takes time for the lighting control apparatus to change a dimming level of a desired lighting device.

Thus, lighting control apparatus 10 according to the present embodiment controls dimming levels of lighting devices 30 associated with multiple brightness sensors 20, so as to adjust brightnesses indicated by detection results detected by multiple brightness sensors 20 to predetermined brightnesses. Lighting control apparatus 10 includes querier 11 which periodically queries each of multiple brightness sensors 20 for a detection result; and controller 12 which controls, for each of lighting devices 30, the dimming level of lighting device 30 associated with brightness sensor 20 among multiple brightness sensors 20 queried by querier 11, according to the detection result detected by brightness sensor 20. Querier 11 assigns priorities to multiple brightness sensors 20, and queries multiple brightness sensors 20 for detection results, according to the priorities.

Moreover, lighting system 1 according to the embodiment includes: lighting control apparatus 10; multiple brightness sensors 20; and lighting devices 30.

This allows priorities to be assigned to brightness sensors 20 so that brightness sensor 20, associated with lighting devices 30 the brightnesses of which are desired to be changed shortly, is queried shortly. Thus, the dimming levels of desired lighting devices 30 can be changed shortly.

Moreover, querier 11 (i) assigns the priorities to multiple brightness sensors 20, according to differences between target values indicating the predetermined brightnesses and previous values indicating brightness values indicated by the detection results previously queried for by querier 11 and detected by multiple brightness sensors 20. Then, querier 11 (ii) queries multiple brightness sensors 20 for detection results, in order of precedence, starting with brightness sensor 20 that has the greatest difference among the differences between the target values and the previous values.

This allows brightness sensors 20 to be queried in order of precedence, starting with brightness sensor 20 that is associated with lighting devices 30 illuminating an illuminated area the brightness of which is far from the target brightness (too bright or too dim). Accordingly, as desired lighting devices 30, the dimming levels of lighting devices 30 illuminating the illuminated area the brightness of which is far from the target brightness can be changed shortly.

Moreover, querier 11 (i) assigns the priorities to multiple brightness sensors 20, according to magnitude relationships between target values indicating the predetermined brightnesses and previous values indicating brightness values indicated by the detection results previously queried for by querier 11 and detected by multiple brightness sensors 20. Then, querier 11 (ii) queries multiple brightness sensors 20 for detection results, in order of precedence, starting with a brightness sensor whose previous value relative to the target value is a smallest.

In general, little brightness more often compromises user's operation or the like than too much brightness. Accordingly, brightness sensors 20 are queried in order of precedence, starting with brightness sensors 20 associated with lighting devices 30 illuminating an illuminated area the brightness of which is dimmer than the target brightness. This allows, as desired lighting devices 30, the dimming levels of lighting devices 30 illuminating the illuminated area the brightness of which is dimmer than the target brightness to be increased shortly.

Moreover, if a brightness indicated by the detection result queried for by querier 11 and detected by the brightness sensor is not the predetermined brightness, controller 12 gives a dimming instruction to lighting device 30 associated with the brightness sensor. Querier 11 (i) assigns the priorities to multiple brightness sensors 20 according to whether controller 12 has previously given, for each of multiple brightness sensors 20, the dimming instruction to lighting device 30 associated with the brightness sensor. Then, querier 11 (ii) queries multiple brightness sensors 20 for detection results, in order of precedence, starting with a brightness sensor associated with lighting device 30 to which controller 12 has previously given the dimming instruction.

This allows brightness sensors 20 to be queried in order of precedence, starting with brightness sensor 20 that is associated with lighting devices 30 to which dimming instructions have been previously given and which are illuminating an illuminated area the brightness of which is not the target brightness. Accordingly, as desired lighting devices 30, the dimming levels of lighting devices 30 illuminating the illuminated area the brightness of which is not the target brightness can be changed shortly.

Moreover, each of lighting devices 30 has a brightness control mode in which the brightness is controlled according to the detection result detected by brightness sensor 20 associated with lighting device 30, and a constant dimming mode in which the dimming level of lighting device 30 is maintained constant. Querier 11 (i) assigns the priorities to multiple brightness sensors 20 according to current modes of lighting devices 30 associated with multiple brightness sensors 20. Then, querier 11 (ii) queries multiple brightness sensors 20 for detection results, in order of precedence, starting with brightness sensor 20 associated with lighting device 30 in the brightness control mode.

This allows brightness sensors 20 to be queried in order of precedence, starting with brightness sensor 20 that is associated with lighting devices 30 in the brightness control mode in which brightness needs to be controlled according to a detection result detected by brightness sensors 20. Accordingly, as desired lighting devices 30, the dimming levels of lighting devices 30 in the brightness control mode can be changed shortly.

Moreover, controller 12 further controls color temperatures of lighting devices 30. Querier 11 (i) assigns the priorities to multiple brightness sensors 20, according to the color temperatures of lighting devices 30 associated with multiple brightness sensors 20, and (ii) queries multiple brightness sensors 20 for detection results, in order of precedence, starting with brightness sensor 20 associated with lighting device 30 which has the lowest color temperature among lighting devices 30.

In general, a person more likely perceives brightness of a bulb lamp color having a low color temperature as dim, than a daylight color having a color temperature. Accordingly, brightness sensors 20 are queried in order of precedence, starting with brightness sensor 20 that is associated with lighting devices 30 producing a lowest color temperature. This allows, as desired lighting devices 30, the dimming levels of lighting devices 30 producing a low color temperature to be increased shortly.

Other Embodiments

While lighting control apparatus 10 and lighting system 1 according to the embodiment have been described, the present disclosure is not limited to the above embodiment.

For example, while multiple brightness sensors 20 are assigned with priorities according to Examples 1 through 5 in the above embodiment, the present disclosure is not limited thereto. For example, multiple brightness sensors 20 may be assigned with priorities according to a combination of Examples 1 through 5. For example, the priorities shown in Examples 1 through 5 may further be prioritized.

Specifically, for example, the priorities of brightness sensors 20 associated with lighting devices 30 in the brightness control mode illustrated in Example 4 are elevated over the others. Then, among brightness sensors 20 which take priorities over the others according to Example 4, the priorities of brightness sensors 20 associated with lighting devices 30 to which controller 12 has previously given the dimming instructions as illustrated in Example 3 are elevated over the others. Then, among brightness sensors 20 which take priorities over the others according to Examples 4 and 3, the priorities of brightness sensors 20 whose previous values relative to the target values are small are elevated over the others according to Example 2. Then, among brightness sensors 20 which take priorities over the others according to Examples 4, 3, and 2, the priorities of brightness sensors 20 having great differences between the previous values and the target value are elevated over the others according to Example 1. Then, among brightness sensors 20 which take priorities over the others according to Examples 4, 3, 2, and 1, the priorities of brightness sensors 20 associated with lighting devices 30 producing low color temperatures are elevated over the others according to Example 5.

It should be noted that the manner of further prioritizing the priorities of the brightness sensors according to Examples 1 through 5 described above is one example, and querier 11 may query brightness sensors 20 according to desired priorities determined by a user.

The general or specific aspects of the present disclosure described above may be implemented in a system, method, integrated circuit, computer including a processor, computer program, or computer-readable storage medium such as CD-ROM, or may be implemented in any combination of the system, method, integrated circuit, computer program, and storage medium.

In other instances, various modifications to the exemplary embodiment according to the present disclosure described above that may be conceived by a person skilled in the art and embodiments implemented in any combination of the components and functions shown in the exemplary embodiment are also included within the scope of the present disclosure, without departing from the spirit of the present disclosure.

What is claimed is:

1. A lighting control apparatus which controls dimming levels of lighting devices associated with a plurality of brightness sensors, so as to adjust brightnesses indicated by detection results detected by the plurality of brightness sensors to predetermined brightnesses, the lighting control apparatus comprising:

a querier which periodically queries each of the plurality of brightness sensors for a detection result; and a controller which controls, for each of the lighting devices, the dimming level of the lighting device associated with a brightness sensor among the plurality of brightness sensors queried by the querier, according to the detection result detected by the brightness sensor, wherein the querier assigns priorities to the plurality of brightness sensors, and queries the plurality of brightness sensors for detection results, according to the priorities.

2. The lighting control apparatus according to claim 1, wherein the querier (i) assigns the priorities to the plurality of brightness sensors, according to differences between target values indicating the predetermined brightnesses and previous values indicating brightness values indicated by the detection results previously queried for by the querier and detected by the plurality of brightness sensors, and (ii) queries the plurality of brightness sensors for detection results, in order of precedence, starting with a brightness sensor that has the greatest difference among the differences between the target values and the previous values.

3. The lighting control apparatus according to claim 1, wherein the querier (i) assigns the priorities to the plurality of brightness sensors, according to magnitude relationships between target values indicating the predetermined brightnesses and previous values indicating brightness values indicated by the detection results previously queried for by the querier and detected by the plurality of brightness sensors, and (ii) queries the plurality of brightness sensors for detection results, in order of precedence, starting with a brightness sensor whose previous value relative to the target value is a smallest.

4. The lighting control apparatus according to claim 1, wherein:

if a brightness indicated by the detection result queried for by the querier and detected by the brightness sensor is not the predetermined brightness, the controller gives a dimming instruction to the lighting device associated with the brightness sensor, and the querier (i) assigns the priorities to the plurality of brightness sensors according to whether the controller has previously given, for each of the plurality of brightness sensors, the dimming instruction to the lighting device associated with the brightness sensor, and (ii) queries the plurality of brightness sensors for detection results, in order of precedence, starting with a brightness sensor associated with a lighting device to which the controller has previously given the dimming instruction.

5. The lighting control apparatus according to claim 1, wherein:

each of the lighting devices has a brightness control mode in which the brightness is controlled according to the detection result detected by the brightness sensor associated with the lighting device, and a constant dimming mode in which the dimming level of the lighting device is maintained constant, and the querier (i) assigns the priorities to the plurality of brightness sensors according to current modes of the lighting devices associated with the plurality of brightness sensors, and (ii) queries the plurality of brightness sensors for detection results, in order of precedence, starting with a brightness sensor associated with a lighting device in the brightness control mode.

6. The lighting control apparatus according to claim 1, wherein the controller further controls color temperatures of the lighting devices, and the querier (i) assigns the priorities to the plurality of brightness sensors, according to the color temperatures of the lighting devices associated with the plurality of brightness sensors, and (ii) queries the plurality of brightness sensors for detection results, in order of precedence, starting with a brightness sensor associated with a lighting device which has the lowest color temperature among the lighting devices.

7. A lighting system comprising:
the lighting control apparatus according to claim 1;
the plurality of brightness sensors; and
the lighting devices.

\* \* \* \* \*